United States Patent Office 3,475,406
Patented Oct. 28, 1969

3,475,406
POLYMERS PREPARED FROM UREA OR THIOUREA AND DIAMINES DERIVED FROM DIMERIC FAT ACIDS OF 32 TO 44 CARBON ATOMS
Leonard R. Vertnik and Harold Wittcoff, Minneapolis, Minn., assignors to General Mills, Inc., a corporation of Delaware
No Drawing. Continuation-in-part of application Ser. No. 247,876, Dec. 28, 1962. This application Feb. 23, 1967, Ser. No. 617,795
Int. Cl. C08g 22/02
U.S. Cl. 260—18                                    6 Claims

ABSTRACT OF THE DISCLOSURE

Polymers are prepared from urea or thiourea and diamines derived from dimeric fat acids of 32 to 44 carbon atoms.

---

This application is a continuation-in-part of our copending application Ser. No. 247,876, filed Dec. 28, 1962, now abandoned.

The present invention relates to new polymer compositions. More particularly, it relates to novel polymers prepared from urea or thiourea and diamines derived from dimeric fat acids of 32 to 44 carbon atoms.

It is an object of the present invention to provide new polymer compositions.

Another object of the invention is to provide such polymer compositions from urea or thiourea and diamines derived from dimeric fat acids of 32 to 44 carbon atoms.

These and other objects will become apparent from the following detailed description.

We have now discovered that highly useful new polymer compositions can be prepared by reacting urea or thiourea with a dimer diamine derived from 32 to 44 carbon atom dimeric fat acids. These new polymers can be readily molded to form tough, pliable materials. They also have outstanding adhesion to metals. They find particular use in coating, adhesive and molding applications.

The diamines used in the preparation of the polymers of the present invention contain 32 to 44 carbon atoms and are derived from the corresponding dimerized fat acids. Such dimerized fat acids are prepared by polymerizing ethylenically unsaturated monobasic carboxylic acids having 16 to 22 carbon atoms or the lower alkyl esters thereof. The preferred acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadesenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14-octadecatrienoic (pseudo-eleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the dimerization of the unsaturated acids. Lower temperatures are generally used when a catalyst is employed.

The polymerization of the desired ethylenically unsaturated acids yields relatively complex products which usually contain a predominant portion of dimerized acids, a smaller quantity of trimerized and higher polymeric acids and some residual monomers. The 32 to 44 carbon atom dimerized acids can be obtained in reasonably high purity from the polymerization products by vacuum distillation at low pressures, solvent extraction or other known separation procedures. The polymerization product varies somewhat depending on the starting fat acid or mixture thereof and the polymerization technique employed—i.e. thermal, catalytic, particular catalyst, conditions of pressure, temperature etc. Likewise, the nature of the dimerized acids separated from the polymerization product also depends somewhat on these factors although such acids are functionally similar.

Attempts have been made to fully delineate the structures of dimerized acids prepared from ethylenically unsaturated acids. These studies have been based largely on the products obtained by polymerizing linoleic acid or the methyl esters thereof or starting materials rich in linoleic acid or methyl linoleate. Paschke and Wheeler, in a study relating principally to the thermal polymerization of normal methyl linoleate, stated that at least two main products had been identified by others as resulting from such polymerization:

$$CH_3(CH_2)_5-CH-CH-CH-CH-CH=CH-(CH_2)_7COOCH_3$$
$$CH_3(CH_2)_5-CH \qquad CH-(CH_2)_7COOCH_3$$
$$CH=CH$$

and $$CH_3(CH_2)_3-CH-CH-CH_2-CH=CH-(CH_2)_7COOCH_3$$
$$CH_3(CH_2)_5-CH \qquad CH-(CH_2)_7COOCH_3$$
$$CH=CH$$

Their experimental work then indicated the latter structure predominated in the thermal polymerization product (The Journal of the American Oil Chemists Society, vol. XXVI, No. 6, June 1949, pages 278–83). Moore theorized (using the Diels-Alder mechanism) that the polymerization of linoleic acid would yield a variety of 36 carbon atom acids of high structural similarity (Paint, Oil & Chemical Review, Jan. 4, 1951, pp. 13–15, 26–29). Thus it was generalized that a portion of normal linoleic acid having the structure $$CH_3(CH_2)_4CH=CHCH_2CH=CH(CH_2)_7COOH$$

(depicted for convenience as

R—C=C—C—C=C—R')

would be conjugated during the polymerization to the 9,11 acid;

$$CH_3(CH_2)_4CH_2CH=CHCH=CH(CH_2)_7COOH$$

(depicted for convenience as

R—C—C=C—C=C—R').

It was then set forth that these acids could polymerize as follows:

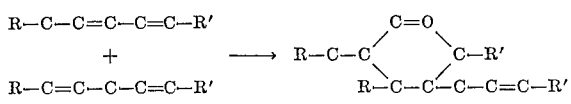

or

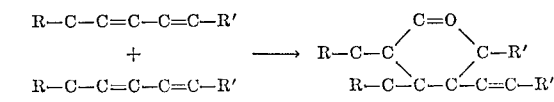

or

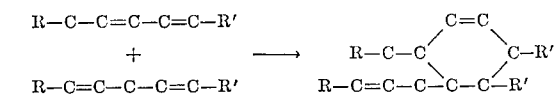

or

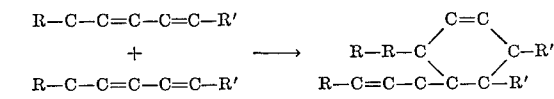

Moore further indicated that the 9,12-linoleic acid could also conjugate to the 10,12 acid and that this acid could self-polymerize or polymerize with the 9,12 or 9,11 acids. It was stated that the polymerizations could be "head-to-tail" as well as "head-to-head" as depicted above. Moore further stated that in many instances octadecatrienoic acids are present in many of the naturally occurring raw materials rich in octadecadienoic acids and that the self-polymerization of said acid could be depicted as follows:

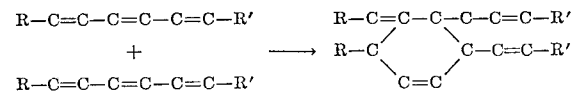

However, the author stated that such a product had not been isolated and that a second reaction probably takes place which could yield a diacid of the structure.

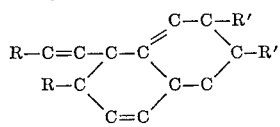

Ault et al. gave a possible structure for the dimer of methyl α-eleostearate, an ester of an octadecatrienoic acid, as follows:

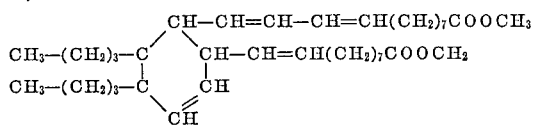

However, they also postulated that the structure could in fact be more complicated. Thus it was postulated that further cyclic rings were formed due to the high unsaturation giving a compound having the following proposed structure:

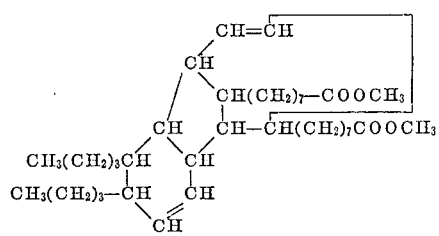

(Industrial And Engineering Chemistry, vol. 34, No. 9, September 1942, pp. 1120-3).

Other information that we have obtained is in essential agreement with the above studies. Thus analysis of dimerized acids prepared from linoleic acid rich starting materials using heat alone or heat plus a catalyst, such as an acid or alkaline clay, shows that the product contains structurally similar acids having monocyclic tetrasubstituted cyclohexene ring structures as well as acids with two and three rings, such additional rings generally being fused to the six carbon atom ring. Additionally, the clay catalyzed dimerized acids have been shown to contain some aromatic rings according to ultraviolet and infrared spectroscopy. These aromatic rings are believed to be formed by hydrogen transfer (by catalytic action of clay) from the substituted cyclohexene ring to form a substituted benzene ring. Such acids are believed to comprise less than about 20% by weight of the dimerized fat acid. Polymerization of pure oleic acid using a clay catalyst has been shown to yield a mixture of dimerized fat acids of which approximately 25–30% by weight have a tetrasubstituted cyclohexene ring with the remainder being non-cyclic. However, when mixtures of oleic and linoleic acids (such as from tall oil) are polymerized, the resulting dimerized fat acid contains little if any dimer having a non-cyclic structure.

It is thus apparent that the polymerization of the ethylenically unsaturated acids yields complex products. The dimer fraction thereof, generally consisting of a mixture of acids, can be assigned the formula:

HOOC—R—COOH where R is a divalent hydrocarbon group containing 30 to 42 carbon atoms. It is also apparent that said divalent hydrocarbon group is complex. However, from the noted studies and other information that we have obtained, it can be seen that a mixture of acids normally results from the polymerization and subsequent fractionation and these acids have structural and functional similarities. Thus such mixture of acids contains a significant proportion of acids having a six carbon atom ring (about 25% or more even when the starting fat acid is a mono-olefinically unsaturated acid such as oleic). The remaining carbon atoms in the divalent hydrocarbon group of such ring containing acids are then divided between divalent and monovalent radicals which may be saturated or ethylenically unsaturated. Such radicals may form one or more additional cyclic structures which are generally fused to the first six membered ring. Such dimeric acids may be considered as having a theoretical idealized, general formula as follows:

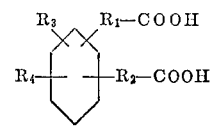

where $R_1$ and $R_2$ are divalent hydrocarbon radicals, $R_3$ and $R_4$ are monovalent hydrocarbon radicals and the sum of the carbon atoms in $R_1$–$R_4$ is 24–36. The ring contains one double bond. It is also understood that the $R_1$–$R_4$ radicals may form one or more additional cyclic structures which are generally fused to the first ring. It is further understood that the ring or rings may be saturated such as where the dimer acids are hydrogenated under conditions which convert the unsaturated acids to the corresponding saturated compounds.

As a practical matter, the dimeric fat acids are preferably prepared by the polymerization of mixtures of acids (or the simple aliphatic alcohol esters—i.e. the methyl esters) derived from the naturally occurring drying and semi-drying oils or similar materials. Suitable drying or semi-drying oils include soybean, linseed, tung, perilla, oiticica, cottonseed, corn, sunflower, dehydrated castor oil and the like. Also, the most readily available acid is linoleic or mixtures of the same with oleic, linolenic and the like. Thus, it is preferred to use as the starting materials, mixtures which are rich in linoleic acid. An especially preferred material is the mixture of acids obtained from tall oil which mixture is composed of approximately 40–45% linoleic and 50–55% oleic. It is also preferred to carry out the polymerization in the presence of a clay. Partial analysis of the dimer fraction obtained from the product prepared by polymerizing the tall oil fatty acids in the presence of 10% by weight of an alkaline montmorillonite clay at a temperature of 230° C. and a pressure of 140 p.s.i. for five hours showed that it was a mixture of $C_{36}$ acids, one significant component being

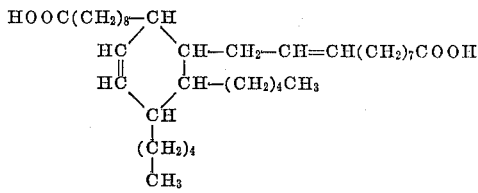

Such polymerized acids were used in the preparation of the dimer diamine employed in the examples to follow.

The diamines are prepared from the dimeric fat acids by converting the dimeric fat acids to the corresponding dinitriles and then hydrogenating the dinitriles to form the diamines. The dinitriles are formed by reacting the dimeric fat acids with ammonia under nitrile forming conditions. The details of this reaction are set forth in chapter 2 of "Fatty Acids and Their Derivates" by A. W. Ralston, John Wiley & Sons, Inc., New York (1948). The diamines are prepared by hydrogenating the dinitriles in the presence of ammonia and a catalyst such as Raney nickel. The preparation of the diamines can be illustrated by the following equations:

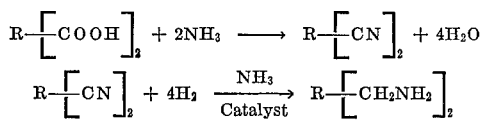

where R is the divalent hydrocarbon group of the dimerized acid containing 30 to 42 carbon atoms.

It is preferred that a relatively pure dimer diamine be used as the starting material in the preparation of the polymers of the present invention. This can be accomplished by using a relatively pure dimerized acid and/or by distilling the corresponding dinitrile and/or diamine. It is understood, however, that the dimer diamine may contain small amounts of monoamines derived from the starting acids and/or small amounts of polyamines derived from trimerized and higher polymeric fat acids. The total amount of such amines should be less than about 10%, and preferably less than about 5% by weight.

The new polymers of our invention can be prepared from either urea or thiourea. However, it is preferred to employ urea.

A portion of the dimer diamine can be replaced by a second diamine having the formula:

$$H_2N-R_5-NH_2$$

where $R_5$ is selected from the group consisting of aliphatic and aromatic groups of about 2 to about 20 carbon atoms. Representative of such compounds are:

ethylene diamine
propylene diamine
1,2-diaminobutane
1,3-diaminobutane
trimethylene diamine
tetramethylene diamine
pentamethylene diamine
hexamethylene diamine
nonamethylene diamine
decamethylene diamine
octadecamethylene diamine
phenylene diamine
metaxylene diamine
paraxylene diamine
cyclohexane diamine
bis-aminoalkyl ethers Other diamines of the above-described formula may also be used as well as mixtures thereof. Preferably, the second diamine is an aliphatic diamine.

The polymers of our invention are prepared by reacting the dimer diamine or mixtures thereof and a second diamine as described with urea or thiourea. Generally, the reaction will be carried out at temperatures of about 120° C. to 300° C. Temperatures above about 300° C. should be avoided because the use thereof might result in some decomposition or degradation of the polymer. Reaction temperatures of about 140° C. to 250° C. are preferred. If desired, the polymerization reaction may be effected in the presence of suitable solvents or dispersing media, provided such media do not interact to any appreciable extent with the reactants and have boiling points sufficiently high to allow the temperature to be maintained at the desired level. The reaction period is not critical and will vary somewhat depending on the particular reactants and the amount thereof, the reaction temperature, and the presence or absence of solvents or diluents. Generally, the reaction will be complete within a few hours—i.e., 5 hours or so.

The mole ratio of the diamine reactant to the urea or thiourea is about 1:1. However, a slight excess of the urea or thiourea can be used. Up to about 50 mole percent of the dimer diamine can be replaced with the above-described second diamine. However, it is preferred to use the dimer diamine alone since the second diamine adversely affects the properties of the polymers—i.e. flexibility and adhesion are reduced with the use of increasing amounts of the second diamine.

The polymers of the present invention are essentially linear and their preparation and structure can be illustrated in general by the following:

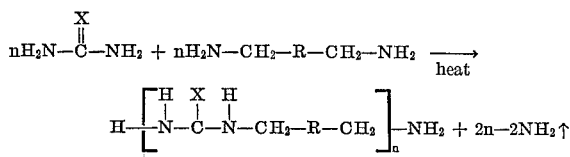

where X is O or S, R is the divalent hydrocarbon radical of the dimerized acid and $n$ is an integer indicating the number of recurring units in the polymer. R is further characterized as generally representing one or more structurally similar radicals, a substantial proportion thereof having the theoretical idealized formula:

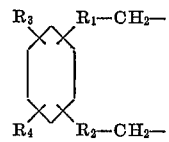

where the ring may be saturated or contained one double bond, $R_1$ and $R_2$ are divalent hydrocarbon radicals, $R_3$ and $R_4$ are monovalent hydrocarbon radicals and the sum of the carbon atoms in $R_1$ through $R_4$ is 24 through 36. The $R_1$ through $R_4$ radicals may be saturated or ethylenically unsaturated and may form one or more additional cyclic structures which are generally fused to the first ring. Where a second diamine is used, the resulting essentially linear copolymer will have randomly distributed recurring units and the idealized, general structure:

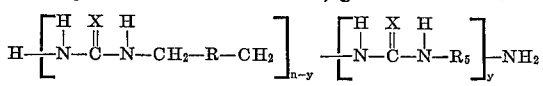

where X, R and $n$ are as defined above, $R_5$ is an aliphatic or aromatic radical, preferably hydrocarbon, containing 2 to 20 carbon atoms and $y$ is an integer indicating the number of recurring units containing the radical $R_5$ in the polymer, such number being less than about one-half of $n$. The integer $n$ is preferably about 5 to 500.

The dimer diamine used in the examples to follow was derived from the polymerized acids prepared from tall oil fatty acids as above described. The polymerized tall oil fatty acids were converted to the corresponding nitriles by reaction with ammonia and then the nitrile was converted to the diamine by hydrogenation in the presence of ammonia and Raney Ni catalyst. The diamine product was vacuum distilled to yield a fraction containing 98% by weight dimer diamine and having an amine equivalent weight of 274. Although the dimer diamine was not completely analyzed, it consisted mainly of a mixture of diamines containing 36 carbon atoms, one significant component being:

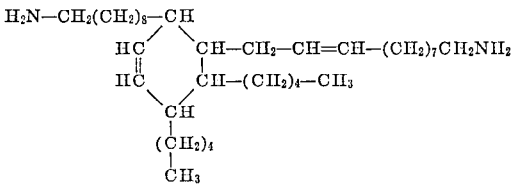

The invention will be better understood with respect to the following examples which illustrate certain preferred embodiments of the present invention.

EXAMPLE I

To a 3-necked, round bottom flask equipped with a stirrer, thermometer, nitrogen inlet and nitrogen outlet were charged 274 g. dimer diamine (1.0 equivalent), 33 g. urea (1.1 equivalent—10% excess) and 3 drops of a 0.1% by weight xylene solution of Dow Corning Antifoam A. The mixture was heated under a nitrogen sweep for 1 hour at 140° C. and for 4 hours at 225–235° C. The reaction mixture was then heated for an additional 40 minutes under water pump vacuum (20 mm.). There was obtained a rubbery polymer which had an Amine No. of 2.3 and an inherent viscosity of 0.442 in m-cresol (1% by weight, 30° C.).

EXAMPLE II

The polyurea of Example I was molded in a 6" x 6" heated mold held in a press at 10,000 pounds ram force (4" ram) and at a temperature of 120° C. to give a molded sheet of approximately 0.045 inch in thickness. Specimens were cut from the molded sheet and tested for elongation and tensile strength, at a strain rate of 2 inches per minute using an Instron Model TTC Tensile Testing Machine in accordance with ASTM D–1248–58T. The maximum elongation was 625% and the tensile strength was 490 p.s.i. The molded sheet also had a Shore A hardness of 60.

EXAMPLE III

A portion of the polyurea of Example I was melted, poured into a metal can, and allowed to cool. The adhesion of the polymer was so great that when an attempt was made to remove the polymer, the metal sheet of the can structure was torn but the adhesive bond was not ruptured.

Examples II and III demonstrate that the polyureas of the present invention are particularly useful for the preparation of fairly strong and flexible molded articles and as adhesives for metals, for example. Polymers of the present invention prepared as in Example I but using a combination of the dimer diamine and a second diamine, namely nonamethylene diamine (1:1 mol ratio), could also be molded. They were somewhat harder and less flexible than the polymer prepared from the dimer diamine alone but showed a high enough flexibility to be very useful. Thus specimens prepared as in Example II had maximum elongations of over 300%. In contrast, a polymer prepared from nonamethylene diamine alone and urea was extremely brittle as shown by the following comparative example.

EXAMPLE IV

To a resin-type flask equipped with a stirrer, thermometer, nitrogen inlet and nitrogen outlet were charged 237 grams nonamethylene diamine (3.0 equivalents), 100 grams urea (3.3 equivalents—10% excess) and 6 drops of a 0.1% by weight xylene solution of Dow Corning Antifoam A. The mixture was heated under a nitrogen sweep for about 1 hour at 140–150° C. and for about 4 hours at 215–260° C. The reaction mixture was then heated for an additional 15 minutes under water pump vacuum. There was obtained a polymer which was too viscous to run. The polyurea polymer was molded in a 6" by 6" heated mold held in a press at 30,000 pounds ram force and at a temperature of 430° F. to give a molded sheet of approximately 0.045 inch in thickness. The molded specimen was of poor quality—hard and brittle. Specimens were cut from the sheet with difficulty and the same were tested for elongation using an Instron Model TTC Machine in accordance with ASTM D–1248–58T. The maximum elongation obtained on four specimen was 107%. The other three specimens gave maximum elongation of 2%, 7% and 21%.

The data of Example IV showed that the polyurea polymer prepared from nonamethylene diamine alone when molded is very brittle and has little or no flexibility. It is to be noted that the procedures of Example IV are a duplication of Examples I and II. Thus the same equivalent ratios of reactants were used and the reaction temperatures and times, although differing slightly, are fully comparable since the reaction mixtures were heated until the reactions were completed and by-product ammonia and excess urea substantially completely removed. The difference in molding pressures and temperatures was due to the difference in softening points of the polymers. Thus the polymer of Example I was molded at 120° C. at 10,000 pounds ram force. The polymer of Example IV could not be molded at such temperature. However, it did soften sufficiently at 430° F. to yield a homogeneous molded sheet. The higher pressure was used to shorten the molding period and thus reduce the chance of degradation of the polymer and no degradation was evident.

It is to be understood that the invention is not to be limited to the exact details of operation or the exact compositions shown and described, as obvious modifications and equivalents will be apparent to those skilled in the art and the invention is to be limited only by the scope of the appended claims.

Now, therefore, we claim:

1. A polymer having the structural formula:

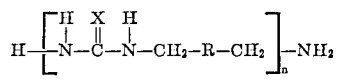

where X is O or S, $n$ is an integer of about 5 to 500, and R is the divalent hydrocarbon radical of dimerized fat acids, said dimerized fat acids having been prepared by dimerizing ethylenically unsaturated 18 carbon atom monobasic carboxylic acids and said divalent hydrocarbon radical being characterized by the presence of a 6 membered carbocyclic ring.

2. The polymer of claim 1 where X is O.

3. The polymer of claim 2 where the ethylenically unsaturated 18 carbon atom monobasic carboxylic acids comprise a mixture rich in linoleic acid.

4. A copolymer having the structural formula:

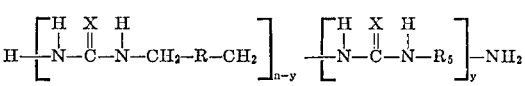

where X is O or S, $n$ is an integer of about 5 to 500, $y$ is the number of recurring units containing the radical $R_5$ in the copolymer chain, such number being less than about one-half of $n$, $R_5$ is an aliphatic or aromatic radical containing 2 to 20 carbon atoms, and R is the divalent hydrocarbon radical of dimerized fat acids, said dimerized fat acids having been prepared by dimerizing ethylenically unsaturated 18 carbon atom monobasic carboxylic acids and said divalent hydrocarbon radical being characterized by the presence of a 6 membered carbocyclic ring.

5. The copolymer of claim 4 where X is O and $R_5$ is an aliphatic hydrocarbon radical.

6. The copolymer of claim 5 where the ethylenically unsaturated 18 carbon atom monobasic carboxylic acids comprise a mixture rich in linoleic acid.

References Cited

UNITED STATES PATENTS

| | | | |
|---|---|---|---|
| 3,223,682 | 12/1965 | Gabler et al. | 260—77.5 |
| 2,379,413 | 7/1945 | Bradley. | |
| 2,435,478 | 2/1948 | Teeter et al. | |
| 2,450,940 | 10/1948 | Cowan et al. | |
| 2,992,195 | 7/1961 | Young et al. | |
| 3,046,254 | 7/1962 | Inaba et al. | |
| 3,297,730 | 1/1967 | Fischer et al. | 260—404.5 |

DONALD E. CZAJA, Primary Examiner

H. S. COCKERAM, Assistant Examiner

U.S. Cl. X.R.

117—127, 161; 260—77.5, 404.5

PO-1050
(5/69)

UNITED STATES PATENT OFFICE
CERTIFICATE OF CORRECTION

Patent No. 3,475,406　　　　　Dated October 28, 1969

Inventor(s) Leonard R. Vertnik and Harold Wittcoff

It is certified that error appears in the above-identified patent and that said Letters Patent are hereby corrected as shown below:

Column 2, line 13, "desired" should read --described--; lines 40-43, the formula should appear as follows:

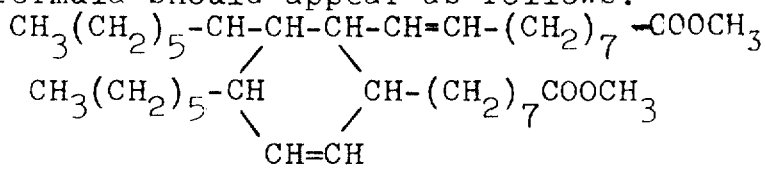

lines 46-48, the left-hand portion of the formula reading

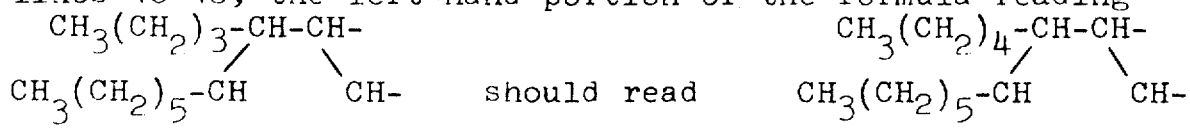

Column 3, lines 3-5 and 8-11, that portion of the formulas readin

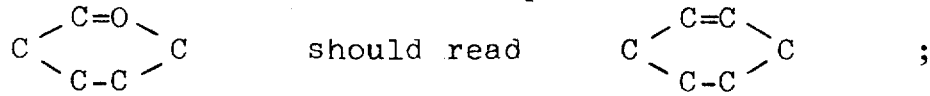

lines 18-22, the right-hand portion of the formula should appear as follows:

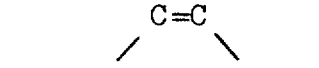

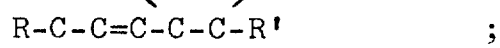

lines 47-52, the formula should appear as follows:

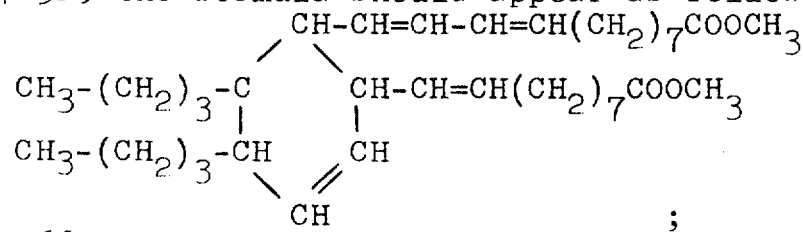

lines 63-66, the left-hand portion of the formula reading

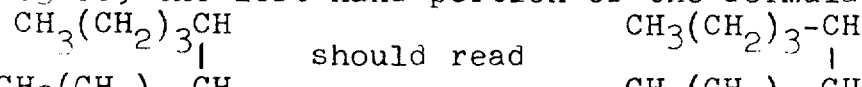

Column 6, lines 35-38, the formula should appear as follows:

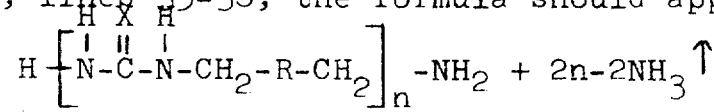

SIGNED AND
SEALED

JUN 9 1970

(SEAL)
Attest:

Edward M. Fletcher, Jr.　　　　　WILLIAM E. SCHUYLER, JR